Sept. 12, 1933.  J. S. RAYNOR  1,926,791
BED FOR PLASTIC MATERIAL
Filed Oct. 12, 1929   3 Sheets-Sheet 1

INVENTOR
John S. Raynor
By W. W. Williamson
Atty.

Sept. 12, 1933.  J. S. RAYNOR  1,926,791
BED FOR PLASTIC MATERIAL
Filed Oct. 12, 1929  3 Sheets-Sheet 2
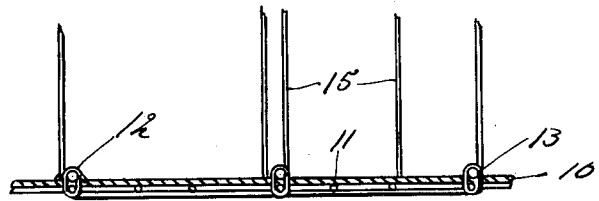
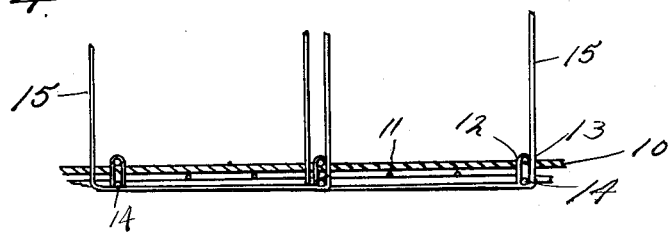
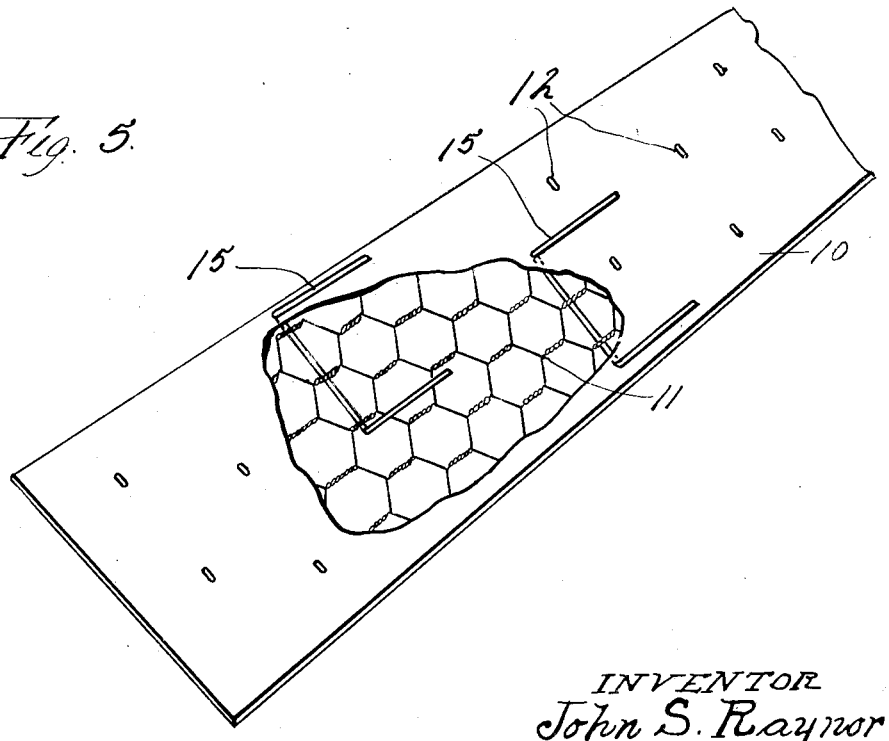
INVENTOR
John S. Raynor
By W. W. Williamson
Atty.

Sept. 12, 1933.   J. S. RAYNOR   1,926,791
BED FOR PLASTIC MATERIAL
Filed Oct. 12, 1929   3 Sheets-Sheet 3

INVENTOR
John S. Raynor
By W. W. Williamson
Atty

Patented Sept. 12, 1933

1,926,791

UNITED STATES PATENT OFFICE 1,926,791

BED FOR PLASTIC MATERIAL

John S. Raynor, Holmesburg, Pa.

Application October 12, 1929. Serial 399,358

3 Claims. (Cl. 72—116)

My invention relates to new and useful improvements in a bed for plastic material and has for one of its objects to provide means for receiving and firmly holding applied plastering so that it will be free from stains due to other materials in proximity thereto.

Another object of the invention is to provide means for receiving and firmly holding applied plastering to concrete or cementitious bodies.

It is a well recognized fact that in applying plaster to concrete or cement walls or surfaces that it is necessary to provide keys or grips into which the mortar or plaster may be forced and thus provide a bond between the two materials. Up to the present time there has been no satisfactory practical method of doing this and even where some semblance of a bond has been provided which might hold on with sufficient tenacity to pass inspection, it has been found that the applied plastering becomes discolored from the material within the cementitious structure or from stains, pigments or other colored matter on or in the cementitious structure in proximity to the applied plaster. These disadvantages are entirely overcome by the use of my invention wherein a film is disposed between the cementitious structure and the applied plaster which prevents the passage of stains, pigments or other matter which might discolor the plaster and wherein suitable keys are partially embedded within the cementitious structure so as to become, from a practical standpoint, integral parts of the cementitious structure and which when the wanted plaster is properly applied, will adhere to such an extent that it is exceedingly difficult to purposely break it away.

Another object of the invention is to provide a bed for plastic material which will be relatively inexpensive in the cost of manufacture, permitting its use at a relatively small advance in price over the cheapest method of plastering on cementitious structures and which may be used at a considerably less cost than the well known cleat system and the wire system.

The cost of applying the bed such as herein described is inexpensive because unskilled labor may be used and the same may be applied quickly and without the necessity of making accurate measurements for positioning the bed.

A further object of the invention is to provide a bed for plastic material which enables me to use a film of any material best suited for the work to which it is to be applied, such as to the under side of concrete surfaces, the outer sides of concrete surfaces, such as ceilings, of the space or the underside of the slab of concrete that forms the ceiling, beams, girders, columns, spandrels, lounettes, niches, soffits, etc. and the outer sides of walls, abutments, piers, pilasters, revels, imposts, and other places formed to receive building construction. The bed for plastic material can be placed in any form constructed or fashioned into any shape, configuration or design that is prepared to receive a built-up mass or a pouring of mass materials. The bed is placed against the forms while being constructed or laid down upon the forms as in flat surfaces or fashioned and set in to forms as in columns, pilasters, niches, etc.

A further object of the invention is to provide a bed for plastic material in which the soup or fluid concrete will be retained until set and thus prevent it from dripping through the points in the wood decking and from running away from the soffit joints. One of the improved advantages of the invention is that it can be shaped to the various configurations of beams, girders, accumulations and the like without cutting it and it can be lapped and when the short end is not too wasteful, it can be lapped and thus prevent the soup from running out.

It might be well to state at this time that the plastering bed can also be placed against the inside or the outside surface of brick, tile or gypsum walls. As an insulator cork or other insulating materials, it can be applied directly against the surface of the wall, it being understood, of course, the nailing blocks are required in the joints of the structure to provide nailing or tying means to secure the bed. It will eliminate the necessity for furring the inside walls over old colored or chimney colored bricks.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 3 is a transverse sectional view showing hangers of wire or other suitable material for permanently holding the bed and keys in place on the supporting structures, such as beams or reinforcing rods while the cementitious structure is setting.

Fig. 4 is a similar view of a slightly modified form of beds and keys.

Fig. 5 is a perspective view of a portion of a sheet or strip of material constituting the bed and keys with a part of the film broken away to illustrate the arrangement of the secondary wire forming the keys and showing a number of hangers to illustrate how they may be connected to form a part of the unitary structure.

In carrying out my invention as herein embodied, 10 represents a film composed of paper, textile fabric or matting of vegetable fibres or other suitable material which will act as a retainer or bed for a cementitious or other plastic substance. This film is preferably imperforate although under some conditions, this is not absolutely essential, especially where a relatively dry mix is used and where the materials entering into the mix are relatively large. The film may also be impervious to water, acids and other liquids to prevent the passage of such liquids or fluids into the plaster held by the keys as will be presently described. Where there is no substance in the neighborhood of the bed which will be likely to discolor the plaster, said film does not have to be impervious.

Wherever wires are referred to, it is intended to cover metal or other threads or strands as well as rope, rods and other devices of any cross sectional shape or dimensions which might be used for the purposes intended.

Also wherever in this specification, a secondary wire, bond or key is referred to, it is intended to cover any suitable device, such as strands or threads of metal or other material, wire forms, such as metal lath and poultry wire or matted formations of metal, textile fabrics, vegetable fibres and paper, matted or otherwise to which plaster will properly adhere.

Figure 8:
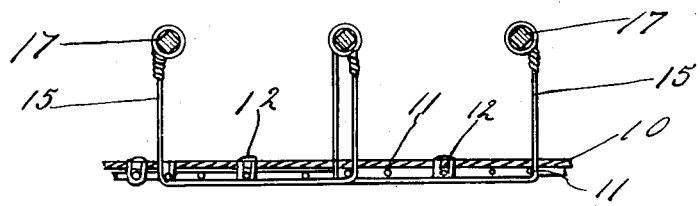
Fig. 8 is a sectional view similar to Figs. 3 and 4 showing a further modified form of my plastering bed and keys.

As shown in Fig. 8, the secondary, bond, wire or key 11 may be secured directly to the film 10 by means of staples 12 or other suitable fastening devices or said secondary wire or key may be secured to the film through the medium of the above mentioned staples and the primary wires 13 which are mounted on the surface, side or face of the film opposite the primary wire or key with the staples passing over said primary wires, as shown in Fig. 3.

This arrangement, in effect, increases the supporting surface for the secondary wire or key element, for while it may be an easy matter to pull the staples from the fragile film, this is practically impossible with the extended surface of the primary wires bearing on the film.

Figure 1:
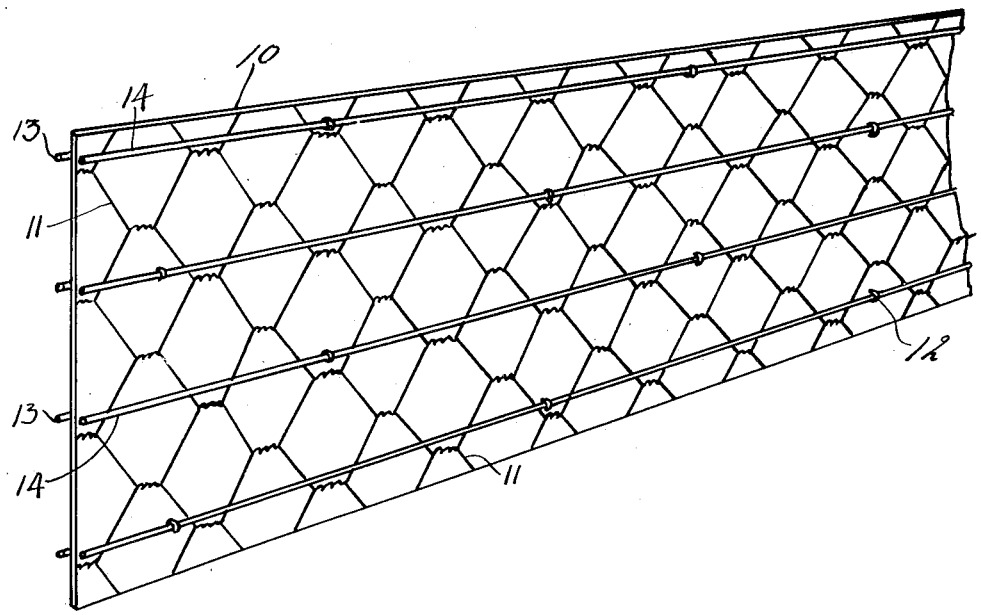
Fig. 1 is a perspective view of a portion of a sheet or strip of covering material constituting the bed or keys for plastering.
Figure 2:
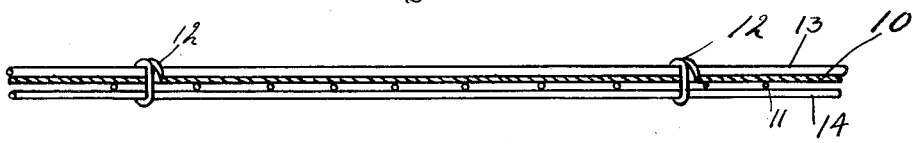
Fig. 2 is an enlarged fragmentary longitudinal sectional view thereof in the region of one of the primary wires.

In Figs. 1, 2 and 4, I have shown still another arrangement in which a second set of primary wires 14 are imposed on the secondary wire or keys and run parallel with the primary wires 13 so that the staples or fastening means holding the parts together straddle both the primary wires of each pair.

In actual practice, the bed and key may be produced by running the film and other elements through a gang stapling or stitching machine, which will staple or otherwise fasten all of the parts together and upon leaving the machine may be wound as a roll of suitable size for use as desired.

While it is not always essential, the bed may be provided with hangers 15 of U-shape so as to extend across a wide area of the bed or key or across the region between two primary wires, as shown in Figs. 3 and 4, but in any case, where the bed or key is rolled up until used, the hangers may bend over or lie flat against the film, as shown in Fig. 5.

Figure 6:
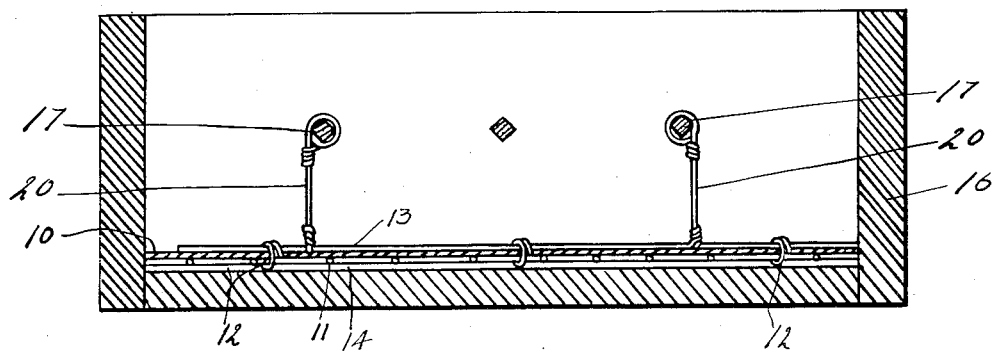
Fig. 6 is a sectional view of a form to receive plastic material in the production of a cementitious structure with my improved plastering bed and keys in place ready to receive the cement.

In actual practice, a form 16, Fig. 6, is usually built to receive the plastic material which is to form a structure, such as a building, and the bed or keys may then be laid in the form against one wall as shown in Fig. 6, or against any number of the walls thereof, and when found desirable, the hangers 15 may be used to support the bed or keys by fastening the ends of said hangers about the reinforcing elements or rods 17 or other suitable supporting means, such as beams, furring bars, studding and the like.

After being properly positioned or placed, the plastic material 18 is poured into the form and laid to set. After the plastic material has hardened, the form is removed leaving a wall similar to that shown in Fig. 7 after which the plaster 19 may be applied to the bed and may be composed of any number of coats, the same as in ordinary plastering work. As will be obvious, the plastering is completely separated from the cementitious material and therefore no coloring matter which might stain the plaster can come in contact with the latter. The exposed surface of the bed whether it includes wires or other elements will provide exceptionally good keys for the applied plaster.

Figure 7:
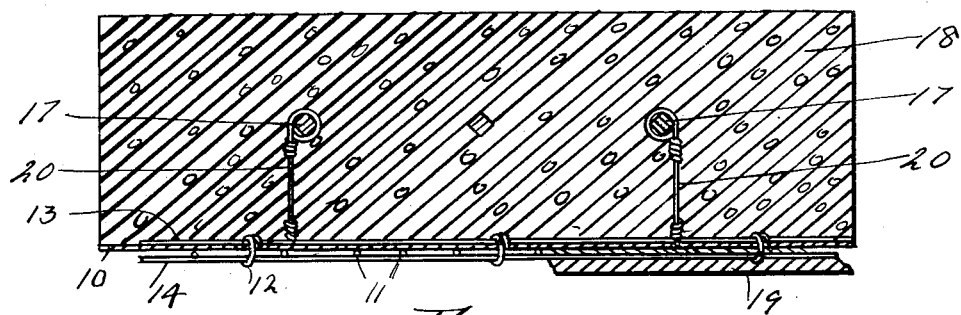
Fig. 7 is a similar view of the structure cast in the form with my improved bed and keys thereon and a portion of plaster in place.

Instead of the hangers 15 previously described, other hangers 20 may be used consisting of short lengths of wire or other suitable pliable material which can be passed under some of the primary wires and then over the reinforcing elements 17, as shown in Figs. 6 and 7.

In actual practice, the bed may be laid down upon or against the walls of the forms or deckings in the same fashion as laying any covering, such, for instance, building paper. It is to be remembered that this is done prior to setting and spacing the slab steel.

In addition to its use in connection with cementitious structures, it may also be used in holding plaster over old discolored brick walls or chimneys or over smooth surfaces eliminating the necessity of using furring or stripping.

Of course I do not wish to be limited to the exact details of construction as herein shown, as these may be varied within the limits of the appended claims without departing from the spirit of my invention.

Having thus fully described my invention, what I claim as new and useful is:—

1. A bed for plastic material comprising an impervious film, bonding means applied directly to said film, portions of which are embedded in a cementitious structure leaving one face of the film and portions of the bonding means exposed for the reception of plaster to be applied thereto, said film acting as a barrier against the passage of unwanted substances.

2. A bed for plastic material including a film, bonding means on said film, said bed adapted to be cast in a face of a cementitious structure so that parts of the bonding means will be exposed to form keys for plaster, and hangers disposed across the bonding means with portions thereof projected through said bonding means to support the bed.

3. A bed for plastic material comprising an impervious film, bonding means applied directly to said film, portions of which are embedded in a cementitious structure leaving one face of the film and portions of the bonding means exposed for the reception of plaster to be applied thereto, said film acting as a barrier against the passage of unwanted substances, and U-shaped hangers swingingly connected to the bed to permit folding in substantially parallel relation to the bed and for use in supporting the bed during the pouring of the cementitious material.

JOHN S. RAYNOR.